United States Patent [19]

Mott

[11] E Patent Number: Re. 31,973

[45] Reissued Date of Patent: Aug. 20, 1985

[54] FLUIDIC FLOW SENSING AND CONTROL APPARATUS

[75] Inventor: Richard C. Mott, Harwood Heights, Ill.

[73] Assignee: Honeywell Inc., Minneapolis, Minn.

[21] Appl. No.: 487,631

[22] Filed: Apr. 22, 1983

Related U.S. Patent Documents

Reissue of:

[64] Patent No.: 4,182,486
Issued: Jan. 8, 1980
Appl. No.: 770,471
Filed: Feb. 22, 1977

U.S. Applications:

[63] Continuation of Ser. No. 590,995, Jun. 27, 1975, abandoned.

[51] Int. Cl.[3] ..... G01F 1/00; F24F 11/04

[52] U.S. Cl. ..... 236/49; 73/861.39; 137/842; 236/80 D

[58] Field of Search ..... 236/49, 13, 80 D, 80 R; 73/861.39; 137/805, 842, 825, 83

[56] References Cited

U.S. PATENT DOCUMENTS

| | | | |
|---|---|---|---|
| 3,030,024 | 4/1962 | Joesting | 236/13 |
| 3,098,383 | 7/1963 | West | 73/861.39 |
| 3,677,086 | 7/1972 | Corey | 73/861.39 |
| 3,680,776 | 8/1972 | Osheroff | 236/1 B X |
| 3,705,534 | 12/1972 | Turek | 73/861.39 |
| 3,719,321 | 3/1973 | McNabney | 236/49 |
| 3,809,314 | 5/1974 | Engelke et al. | 236/49 |

FOREIGN PATENT DOCUMENTS 1518845 2/1967 France .

*Primary Examiner*—William E. Wayner
*Attorney, Agent, or Firm*—Stephen W. Buckingham

[57] ABSTRACT

In a system to control a condition of air in a duct, there is disclosed a first nozzle for issuing a jet fluid, a second nozzle for receiving a portion of said fluid depending upon the condition of the air in the duct, and a circuit arrangement for controlling a damper in the duct dependent upon the amount of fluid received by the second nozzle.

25 Claims, 5 Drawing Figures

FLUIDIC FLOW SENSING AND CONTROL APPARATUS

Matter enclosed in heavy brackets [ ] appears in the original patent but forms no part of this reissue specification; matter printed in italics indicates the additions made by reissue.

This is a continuation of application Ser. No. 590,995, filed June 27, 1975, now abandoned.

BACKGROUND OF THE INVENTION

The invention relates broadly to a system for controlling the condition of air in a duct. More specifically, the invention pertains to a control system which senses the condition of air in a duct to regulate that condition. The condition can be velocity, static pressure or the like.

In controlling a condition of a space, for example temperature, dampers are sometimes used to regulate the amount of conditioned air supplied to one or more zones. The damper is regulated by a sensor, such as a thermostat. If there are a plurality of zones involved, a damper is positioned to control the amount of air supplied individually to each zone and each damper has a different position depending upon the temperature or condition of its associated zone. As the condition in each zone changes, the position of the damper changes which results in a variation in pressure and volume of air delivered by the ducts to the zones. This variation in pressure and volume of air delivered to the zones affects the speed of response of the system.

In order to eliminate this problem, known prior art systems have used static pressure sensors to adjust the position of the damper to maintain the static pressure in the duct constant. These known systems have, however, required the use of complex and expensive control systems.

SUMMARY OF THE INVENTION

The present invention regulates a condition of the air in a duct by the use of a relatively simple and low cost system. It utilizes an air condition sensor means, specifically a velocity sensor, having a first nozzle for issuing a jet of fluid and a second nozzle for receiving a portion of the fluid depending upon the condition in the duct and a control system for utilizing that portion of the fluid received by the second nozzle for positioning the damper according to the condition. The air condition sensor means may be arranged for sensing the velocity of the air moving through the duct or the static pressure of the air in the duct or the like. The system may be either self contained or operate from an independent source of pneumatic pressure or the like.

BRIEF DESCRIPTION OF THE DRAWINGS

Other features and advantages of the invention can be realized when the description below is read in accompaniment with the drawings in which.

DETAILED DESCRIPTION

Figure 1:
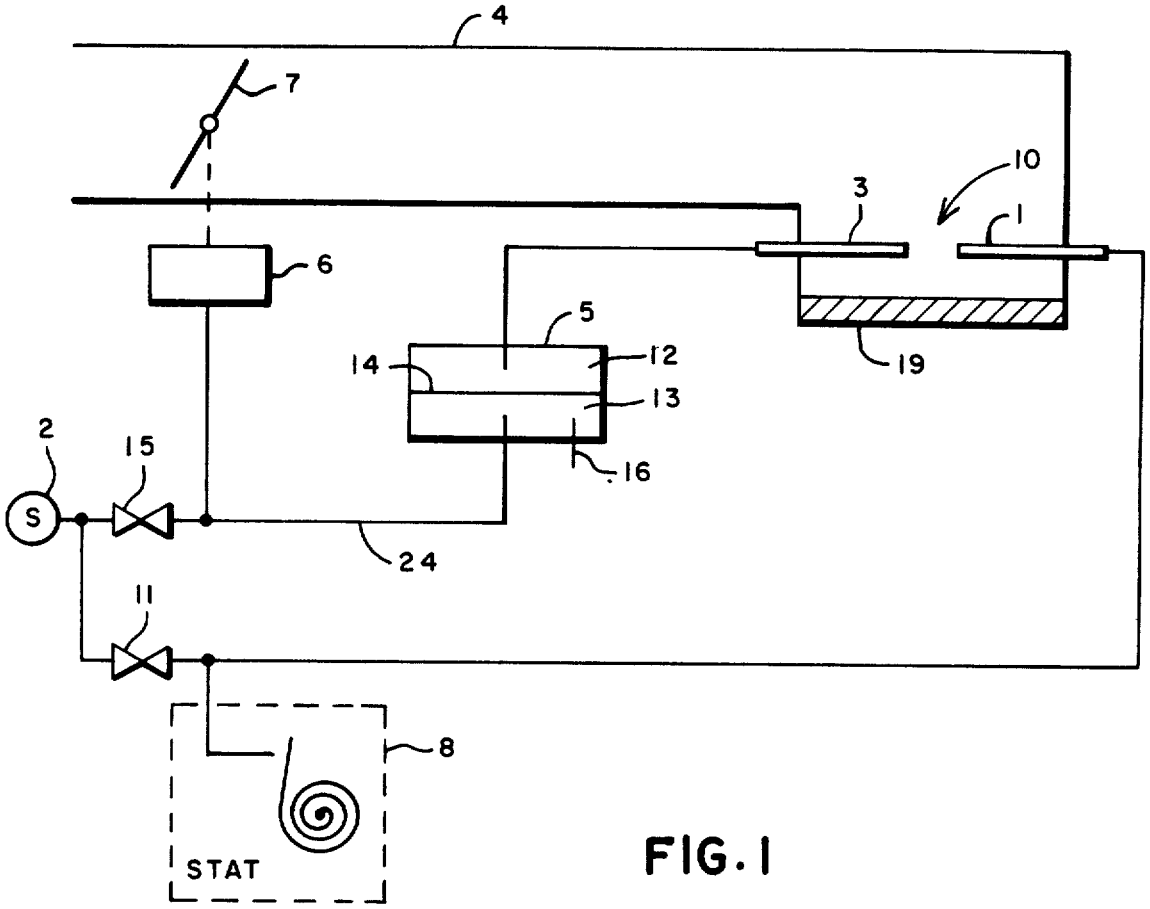
FIG. 1 shows a velocity sensor for sensing the velocity of air moving through a duct.

In FIG. 1, the air condition sensor 10 is a velocity sensor comprising a nozzle 1 connected through a restriction 11 to a fluid source 2 issuing a jet of fluid, preferably air under pressure, towards a nozzle 3. The nozzle 3 receives the portion of the fluid from nozzle 1 dependent upon the velocity of the air within a duct 4. Nozzle 1 issues a jet of fluid, which may be either laminar or turbulent, towards nozzle 3 and nozzle 3 receives an amount of fluid from that jet dependent upon the condition of the air, in this case velocity of air, in duct 4. As the velocity increases, the amount of fluid received by nozzle 3 decreases and, as the velocity decreases, the amount of fluid received by nozzle 3 increases.

Nozzle 3 is connected to a control chamber 12 of an amplifier 5. A flow chamber 13 of the amplifier 5 is separated from control chamber 12 by a diaphragm 14 and is also connected to source 2 through a nozzle 23 and a restriction 15. Flow chamber 13 has an exhaust port 16. A damper actuator 6 is connected downstream of restriction 15 and is used to position damper 7 within duct 4 to regulate the air movement through the duct. A thermostat 8, which may or may not be used, is located downstream of restriction 11 and may comprise a bimetallic element 17 and a nozzle 18 for controlling the fluid supplied to nozzle 1 dependent upon the temperature of a given space. The air supplied through duct 4 is issued through a diffuser 19 into the controlled space in which thermostat 8 is located.

The setpoint for the velocity of the air in duct 4 supplied to the controlled space may be adjusted in a number of ways. One way of adjusting the setpoint is by regulating the distance between nozzles 1 and 3. A second way is shown in FIG. 2.

Figure 2:
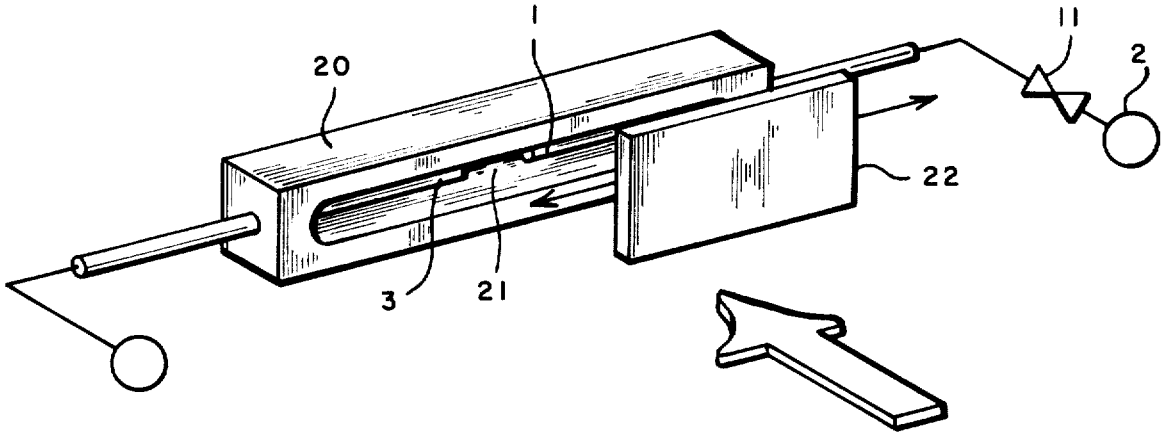
FIG. 2 shows an arrangement for varying the setpoint of the sensor.

In FIG. 2, an elongated container 20, having a slot 21 extending through the width thereof, has nozzle 1 extending through one end of the container into slot 21 and the other nozzle 3 extending through the other end of the container into slot 21. A shield 22 regulates the amount of air passing through slot 21 and, thus, between nozzles 1 and 3.

A third way of adjusting the setpoint is to change the velocity of the air issuing from nozzle 1.

With the setpoint predetermined, an increase in the velocity of the air flowing through duct 4 will divert a larger percentage of the fluid issuing from nozzle 1. Therefore, nozzle 3 will receive a smaller percentage of this fluid and, thus, the pressure in chamber 12 will be reduced allowing the diaphragm to move further off of nozzle 23 reducing the pressure in line 24 to thereby drive actuator 6 to close damper 7 a corresponding amount. Upon movement of damper 7 toward a closing position, the velocity, and thereby the amount, of air flowing in duct 4 will be reduced.

If the velocity of air within duct 4 falls below the setpoint, nozzle 3 will receive a greater percentage of the fluid issuing from nozzle 1 thereby driving diaphragm 14 towards nozzle 23 and raising the pressure in line 24. This raising of the pressure will cause damper actuator 6 to drive damper 7 toward an open position to thereby increase the air movement within duct 4.

During winter operation, if the conditioned space needs additional heat, the bimetallic element 17 tends to close towards nozzle 18 which raises the pressure of the fluid supplied to nozzle 1. With the fluid issuing from nozzle 1 under a greater pressure, nozzle 3 receives a greater portion of fluid to drive diaphragm 14 towards nozzle 23 and thereby raise the pressure in line 24. When the pressure in line 24 increases, damper actuator 6 tends to open damper 7 an additional amount to supply more heated air to the controlled space. Thus, for winter operation, an indirect acting thermostat is needed.

For summer or air conditioning operation, a direct acting thermostat is needed such that as the temperature in the space increases, bimetallic element 17 tends to close against nozzle 18 to raise the pressure of the fluid issuing from nozzle 1. Thus, nozzle 3 will receive a greater portion of fluid tending to close diaphragm 14 against nozzle 23 raising the pressure in line 24 to tend to open damper 7 to supply more cooled air to the conditioned space. The action of the winter and summer thermostats can be reversed if appropriate changes in the circuit are made.

Figure 3:
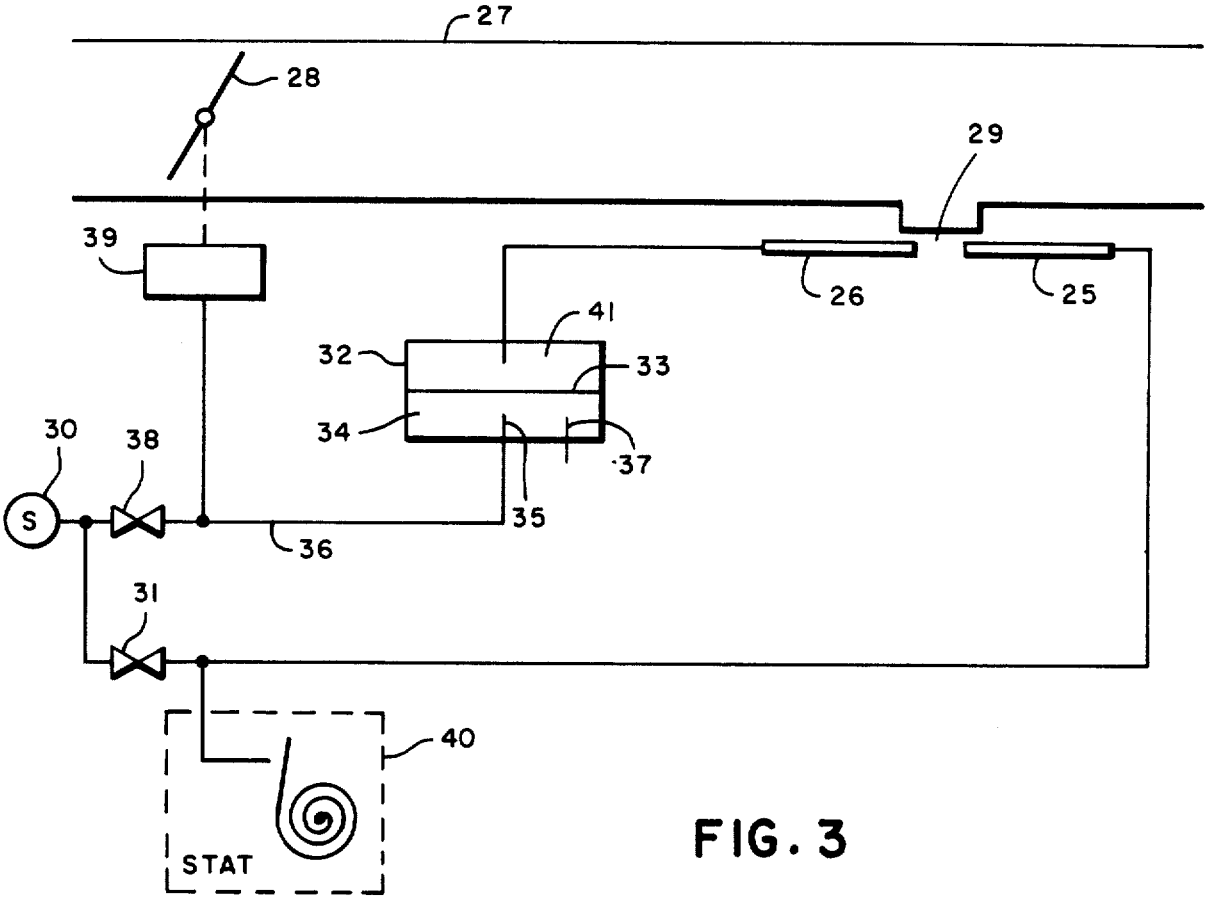
FIG. 3 shows a velocity sensor for sensing static pressure in a duct.

In FIG. 3, the air condition sensor is a static pressure sensor comprising a nozzle 25 for issuing a jet of fluid towards a nozzle 26. Air for delivery to a controlled space is moved through a duct 27 under the control of a damper 28. An aperture 29 is located along the length of duct 27 for passing an amount of air over nozzles 25 and 26 of the sensor dependent upon the static pressure within duct 27.

Nozzle 25 is connected to a source of fluid 30 through a restriction 31 and nozzle 26 is connected to a control chamber 41 of an amplifier 32. The amplifier has a diaphragm 33 for separating control chamber 41 from a flow chamber 34. Diaphragm 33 operates in conjunction with nozzle 35 to control the pressure in line 36. Amplifier 32 also has an exhaust port 37. Line 36 is connected through a restriction 38 to source 30. A damper actuator 39 is connected downstream of restriction 38 and controls the position of damper 28. A thermostat 40 senses the condition of the space and controls the pressure of the fluid supplied to the nozzle 25.

The operation of the system shown in FIG. 3 is basically similar to that shown in FIG. 1. If the static pressure in duct 27 increases, a smaller percentage of fluid issuing from nozzle 25 is received by nozzle 26 which allows diaphragm 33 to move away from nozzle 35 reducing the pressure in line 36. This reduced pressure causes actuator 39 to move damper 28 towards a closing position which reduces the static pressure in duct 27.

If the static pressure in duct 27 decreases, nozzle 26 receives a greater portion of the fluid issuing from nozzle 25 tending to push diaphragm 33 against nozzle 35 increasing the pressure in line 36. This increased pressure causes damper actuator 39 to regulate damper 28 towards an open position to increase the static pressure in duct 27.

Figure 4:
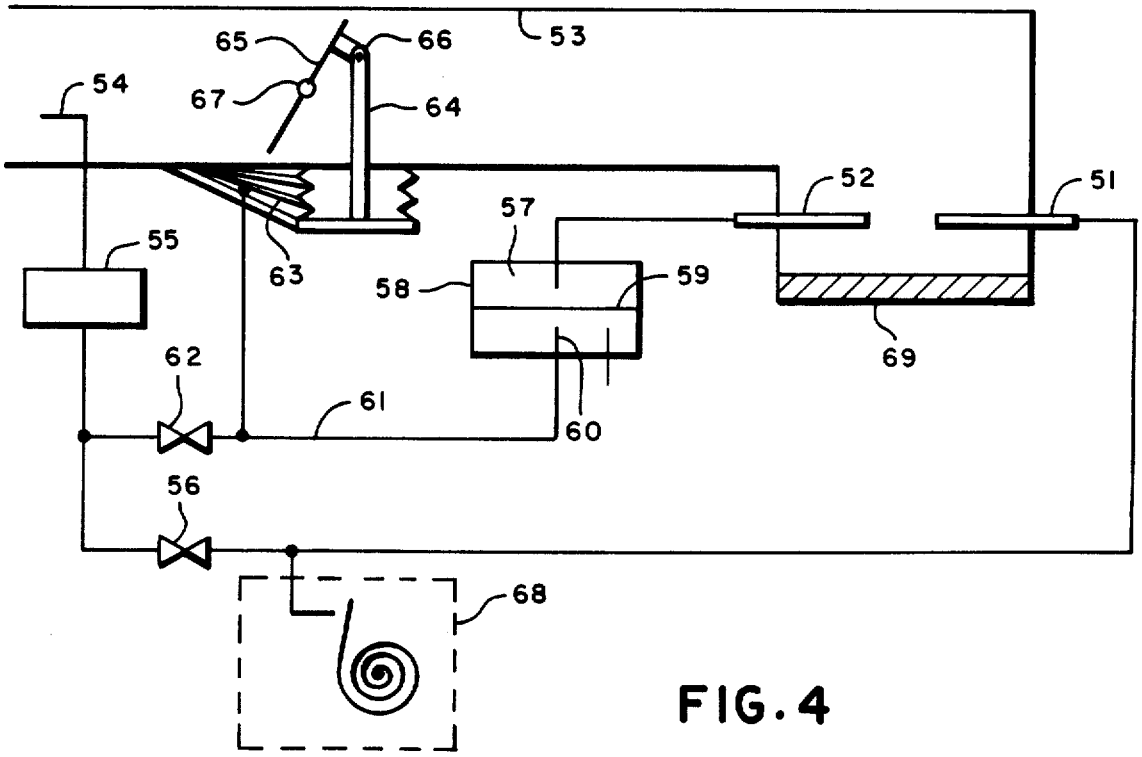
FIG. 4 shows a self contained system utilizing a velocity sensor.

The system shown in FIG. 4 is a self contained system which can be used in either of the system shown in FIG. 1 or FIG. 3 or the like but is specifically shown with respect to the system of FIG. 1. An air condition sensor comprises a nozzle 51 for issuing a jet of fluid and a nozzle 52 for receiving a portion of the jet of fluid depending upon the condition of the air, in this case velocity, in a duct 53. Nozzle 51 receives air from an inlet port 54 pointing upstream in duct 53 which air is regulated by pressure regulator 55 and supplied through a restriction 56. The air received by nozzle 52 is supplied to control chamber 57 of an amplifier 58. The pressure within chamber 57 controls the position of a diaphragm 59 of amplifier 58 with respect to a nozzle 60. Nozzle 60 is connected by a line 61 through a restriction 62 to pressure regulator 55. A bellows 63 is connected downstream of restriction 62 and drives a linkage 64 which is connected to a damper 65 by a pivotal joint 66. The damper pivots around point 67. A thermostat 68 is used to control the pressure of the fluid or air supplied to nozzle 51 dependent upon the temperature of the controlled space which is being supplied by air through a defuser 69 located in duct 53.

When the velocity of air within duct 53 increases, nozzle 52 receives a smaller percentage of air issuing from nozzle 51 which allows diaphragm 59 to move away from nozzle 60 to decrease the pressure in line 61. This decreased pressure is transmitted to bellows 63 tending to collapse bellows 63 and move damper 65 towards a closed position reducing the air movement or velocity through duct 53.

If, on the other hand, the air movement or velocity through duct 53 decreases, nozzle 52 receives a greater percentage of the air issuing from nozzle 51 to tend to close diaphragm 55 against nozzle 60. This closing increases the pressure in line 61 which tends to expand bellows 63 and open damper 65 to increase the air movement or velocity through duct 53.

Figure 5:
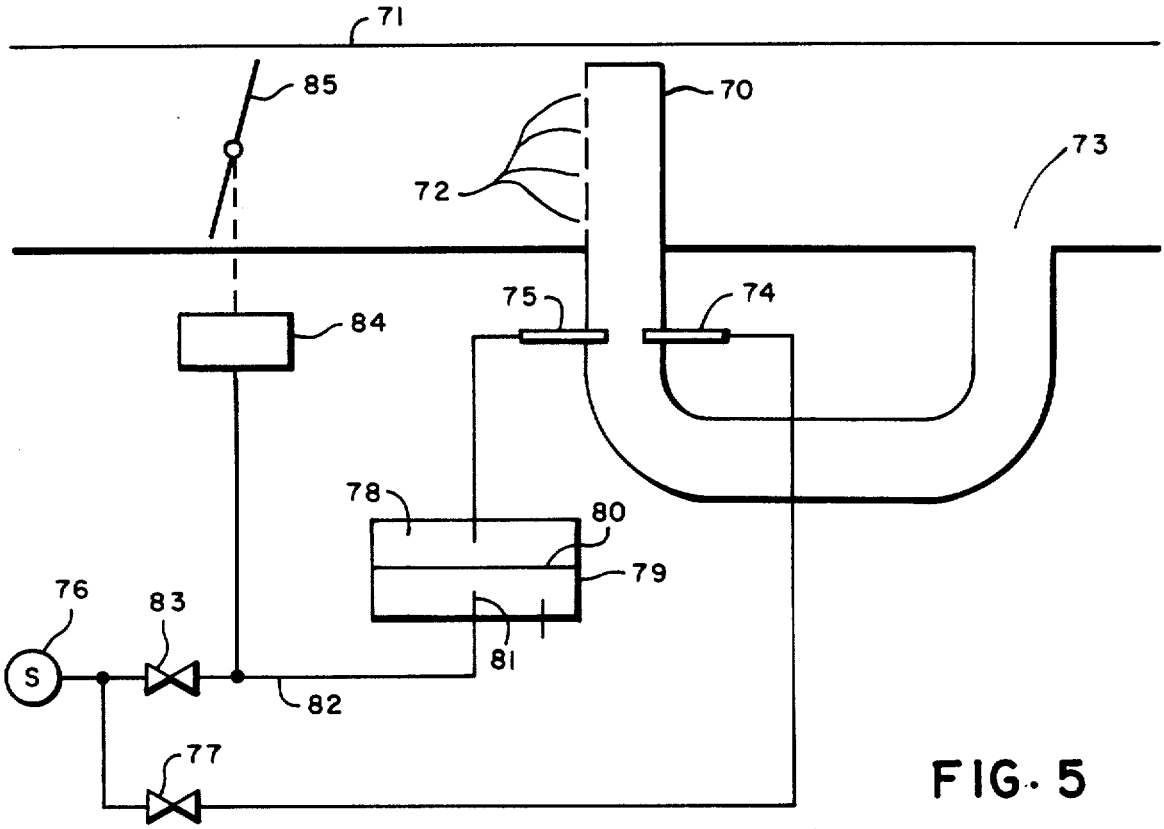
FIG. 5 shows another system for sensing the velocity of air moving through a duct.

The system shown in FIG. 5 represents another method of measuring the velocity of the air moving through a duct. In this case, a tube 70 is located within a duct 71 and has a plurality of openings 72 for receiving the air moving within duct 71. The tube extends in a U-shape manner to the outside of duct 71 and reenters duct 71 at point 73. A first nozzle 74 is located within tube 70 for issuing a jet of fluid toward a nozzle 75. Nozzle 74 receives fluid under pressure from a source 76 through a restriction 77. The portion of fluid received by the nozzle 75 is transmitted to a control chamber 78 of an amplifier 79. A diaphragm 80 of amplifier 79 has its position relative to a nozzle 81 controlled by the pressure within the control chamber 78. Nozzle 81 is connected by a line 82 through a restriction 83 to source 76. A damper actuator 84 is connected downstream of the restriction 83 and is used to control the position of a damper 85.

As the velocity of the air in duct 71 increases, the velocity of the air within tube 70 increases and nozzle 75 receives a smaller percentage of the fluid issuing from nozzle 74. The pressure in chamber 78 thus decreases allowing diaphragm 80 to move away from nozzle 81, decreasing the pressure in line 82 causing actuator 84 to close or tend to close damper 85. The movement of damper 85 towards the closing position decreases the air velocity in duct 71.

On the other hand, if the air velocity within the duct 71 decreases, the air velocity within tube 70 decreases which causes nozzle 75 to receive a greater percentage of fluid issuing from jet 74. The pressure in chamber 78 thus increases tending to move diaphragm 80 against nozzle 81 to increase the pressure in line 82 to cause damper actuator 84 to open damper 85 increasing the air velocity through duct 71.

While in the foregoing specification the invention has been described in considerable detail, it will be understood that such detail is for the purposes of illustration and description and not for the purpose of limitation of the invention which is defined in the appended claims.

The embodiments of the invention in which an exclusive right or property is claimed are defined as follows:

1. A variable volume system for controlling the position of a damper to regulate a condition of air in a duct, said system comprising:

air velocity sensor means comprising first nozzle means and second nozzle means for directly measuring the velocity of air moving past said first and second nozzle means, said first and second nozzle means adapted to be arranged for sensing said condition of said air in said duct by passing at least a portion of said air past said first and second nozzle means, said first nozzle means arranged to issue a jet of fluid and said second nozzle means arranged for receiving a portion of said fluid dependent upon said condition of said air;

fluid supply terminal means;

first connecting means connecting said terminal means to said first nozzle means, *said first connecting means including condition responsive pressure control means for regulating the fluid supplied to said first nozzle means to control the velocity of said jet of fluid;* damper actuator means adapted to control the position of said damper; and, second connecting means connecting said second nozzle means to said damper actuator means for varying the position of said damper dependent upon said condition of said air and dependent upon the velocity of said jet of fluid.

2. The system according to claim 1 wherein said second connecting means comprises an amplifier having a control chamber connected to said second nozzle means, a diaphragm, and a nozzle, controlled by said diaphragm, connected by means to said fluid supply terminal means.

3. The systemm according to claim 1 wherein said fluid supply terminal means comprises inlet port means located in the duct such that said system is self contained.

4. The system according to claim 3 wherein said second connecting means comprises an amplifier having a control chamber connected to said second nozzle means, a diaphragm and a nozzle, controlled by said diaphragm, connected by means to said inlet port means.

5. The system according to claim 4 wherein said damper actuator means comprises a bellows connected to said means connecting said nozzle of said amplifier to said inlet port means.

6. The system according to claim 1 wherein said first and second nozzle means are located non-axially to said air moving past said first and second nozzle means.

7. The system according to claim 1 wherein a shield is positioned with respect to said first and second nozzle means for controlling the setpoint thereof.

[8. The system according to claim 1 wherein said first connecting means comprises pressure control means for regulating the fluid supplied to said first nozzle means to regulate the velocity of said jet of fluid.]

9. The system according to claim [8] *1* wherein said *condition responsive* pressure control means comprises a thermostat for regulating the fluid supplied to said first nozzle means.

10. The system according to claim 9 wherein said second connecting means comprises an amplifier having a control chamber connected to said second nozzle means, a diaphragm, and a nozzle, controlled by said diaphragm, connected by means to said fluid supply terminal means.

[11. The system according to claim 3 wherein said first connecting means comprises pressure control means for regulating the fluid supplied to said first nozzle means to control the velocity of said jet of fluid.]

12. The system according to claim [11] *3* wherein said *condition responsive* pressure control means comprises a thermostat for regulating the fluid supplied to said first nozzle means.

13. The system according to claim 12 wherein said second connecting means comprises an amplifier having a control chamber connected to said second nozzle means, a diaphragm and a nozzle, controlled by said diaphragm, connected by means to said inlet port means.

14. The system according to claim [7] *13* wherein said damper actuator means comprises a bellows connected to said means connecting said nozzle of said amplifier to said inlet port means.

15. A variable volume system for controlling the position of a damper to regulate a condition of air in a duct, said system comprising:

air velocity sensor means comprising first nozzle means and second nozzle means for directly measuring the velocity of air moving past said first and second nozzle means, said first and second nozzle means arranged for sensing said condition of said air in said duct by passing at least a portion of said air past said first and second nozzle means, said first nozzle means arranged to issue a jet of fluid and said second nozzle means arranged for receiving a portion of said fluid dependent upon said condition;

fluid supply terminal means;

first connecting means connecting said terminal means to said first nozzle means, *said first connecting means including condition responsive pressure control means for regulating the fluid supplied to said first nozzle means to control the velocity of said jet of fluid;* damper actuator means for controlling the position of said damper; and, second connecting means connecting said second nozzle means to said damper actuator means for varying the position of said damper dependent upon said condition of said air and dependent upon the velocity of said jet of fluid.

16. The system according to claim 15 wherein said second connecting means comprises an amplifier having a control chamber connected to said second nozzle means, a diaphragm, and a nozzle, controlled by said diaphragm, connected by means to said fluid supply terminal means.

[17. The system according to claim 15 wherein said first connecting means comprises pressure control means for regulating the fluid supplied to said first nozzle means to control the velocity of said jet of fluid.]

18. The system according to claim [17] *15* wherein said *condition responsive* pressure control means comprises thermostat for regulating the fluid supplied to said first nozzle means.

19. The system according to claim 18 wherein said second connecting means comprises an amplifier having a control chamber connected to said second nozzle means, a diaphragm, and a nozzle, controlled by said diaphragm, connected by means to said fluid supply terminal means.

20. The system according to claim [16] *15* wherein said fluid supply terminal means comprises inlet port means located in the duct such that said system is self contained.

21. The system according to claim 20 wherein said second connecting means comprises an amplifier having a control chamber connected to said second nozzle means, a diaphragm, and a nozzle, controlled by said diaphragm, connected by means to said inlet port means.

22. The system according to claim 21 wherein said damper actuator means comprises a bellows connected to said means connecting said nozzle of said amplifier to said inlet port means.

[23. The system according to claim 20 wherein said first connecting means comprises pressure control means for regulating the fluid supplied to said first nozzle means to control the velocity of said jet of fluid.]

24. The system according to claim [23] *20* wherein said *condition responsive* pressure control means comprises a thermostat for regulating the fluid supplied to said first nozzle means.

25. The system according to claim 24 wherein said second connecting means comprises an amplifier having a control chamber connected to said second nozzle means, a diaphragm, and a nozzle, controlled by said diaphragm, connected by means to said inlet port means.

26. The system according to claim 25 wherein said damper actuator means comprises a bellows connected to said means connecting said nozzle of said amplifier to said inlet port means.

27. The system according to claim 15 wherein said first and second nozzle means are located non-axially to said air moving past said first and second nozzle means.

28. The system according to claim 15 wherein a shield is positioned with respect to said first and second nozzle means for controlling the setpoint thereof.

29. A variable volume system for controlling the position of a damper to regulate a condition of air in a duct, said system comprising:

air velocity sensor means consisting of a first nozzle and a second nozzle for directly measuring the velocity of air moving past said first and second nozzles, said first and second nozzles adapted to be arranged non-axially to said air moving past said first and second nozzles for sensing said condition of said air in said duct by passing at least a portion of said air in said duct past said first and second nozzles, said first nozzle arranged to issue a jet of fluid and said second nozzle arranged for receiving a portion of said fluid dependent upon said condition of said air;

fluid supply terminal means;

first connecting means connecting said terminal means to said first nozzle, *said first connecting means including condition responsive pressure control means for regulating the supply of fluid to said first nozzle means to control the velocity of said jet of fluid* ;

damper actuator means adapted to control the position of said damper; and, second connecting means connecting said second nozzle to said damper actuator means for varying the position of said damper dependent upon said condition of said air and dependent upon the velocity of said jet of fluid.

* * * * *